(No Model.)

W. S. & M. C. COOK.
SOLDERING IRON.

No. 466,520. Patented Jan. 5, 1892.

WITNESSES:
E. C. Duffy
H. E. Peck

INVENTORS:
W. S. Cook and
M. C. Cook
BY
ATTORNEY.

United States Patent Office.

WILLIAM S. COOK AND MOSES CHALMER COOK, OF SOUTH OMAHA, NEBRASKA.

SOLDERING-IRON.

SPECIFICATION forming part of Letters Patent No. 466,520, dated January 5, 1892.

Application filed April 7, 1891. Serial No. 387,924. (No model.)

*To all whom it may concern:*

Be it known that we, WILLIAM S. COOK and MOSES CHALMER COOK, of South Omaha, in the county of Douglas and State of Nebraska, have invented certain new and useful Improvements in Soldering-Irons; and we do hereby declare that the following is a full, clear, and exact description of the invention, which will enable others skilled in the art to which it appertains to make and use the same, reference being had to the accompanying drawings, and to letters of reference marked thereon, which form part of this specification.

This invention relates to certain improvements in soldering-irons.

The object of the invention is to provide an improved soldering-iron exceedingly simple, cheap, and durable in construction, particularly adapted for soldering together joints in wires in a quick and thorough manner to make a perfect joint.

Figure 1:
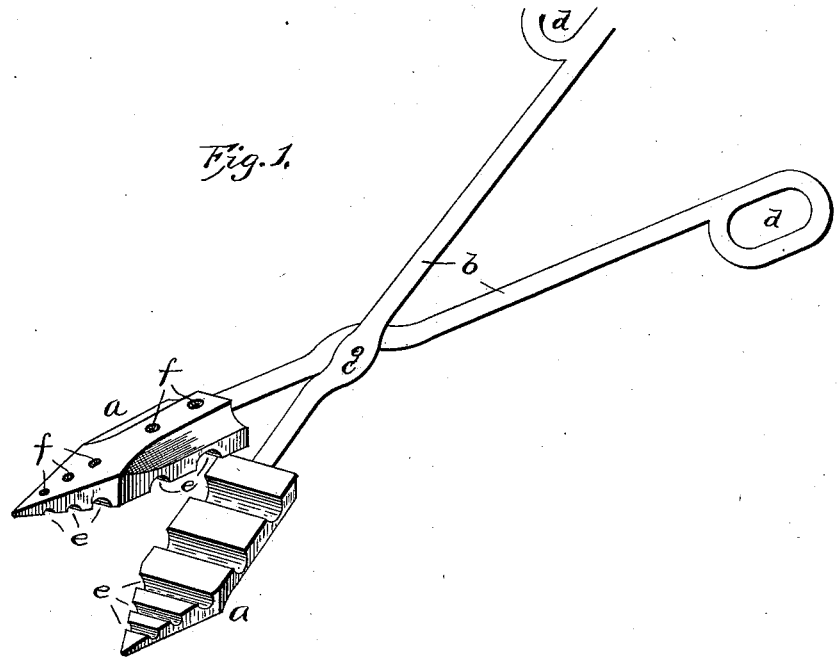
Figure 2:
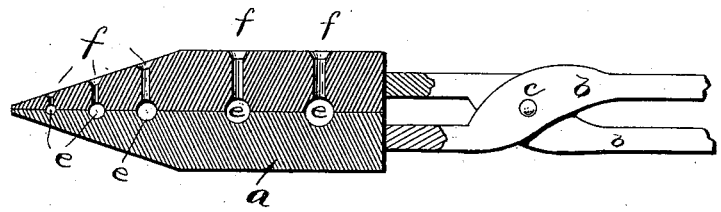

Referring to the accompanying drawings, Figure 1 is a perspective view of the tool with the iron opened. Fig. 2 is a sectional elevation, the iron being closed in operative position.

The present apparatus consists of the two halves or sections $a$ $a$, forming the complete copper or iron carried by the two crossed metal arms or levers $b$ $b$, pivoted together between their ends at $c$, and formed to constitute handles $d$ at their outer ends. Each section $a$ is preferably equal to one-half of an ordinary copper or iron. The inner or contact face of each section $a$ is formed flat, so that the inner faces of the two closely meet when closed to form the copper or iron. Where the iron is formed of two halves, as here shown, the inner face of each half or section is provided with one or more transverse semi-cylindrical grooves $e$, extending completely across such face, the grooves in each face registering when the sections are together, as shown in Fig. 2, so as to form the substantially cylindrical opening at each end to receive the joint between the sections of wire. A series of wire-receiving openings or sockets are provided, as shown, of greatly varied diameters to receive wires of different diameters. The iron is provided with the passages $f$, extending, preferably, at right angles to openings $e$, through the iron from the exterior (upper) side thereof into the openings $e$, preferably about midway between their ends, a passage $f$ opening into each socket or opening $e$, said passages being usually countersunk at their outer ends.

In practice the ends of electric wires are united by twisting the same around each other in the direction of the length of the wire, and the joint is then formed electrically perfect so far as possible by coating the same with solder after removing oxidized coatings by acid. Heretofore this solder has ordinarily been applied by the usual solid imperforate iron; but particularly with ordinary solid iron in cold windy weather it is very difficult to apply the solder properly to make a good joint.

In using this invention the wire ends are properly twisted and treated and the iron heated and opened and the wire-joint placed in the groove $e$, which it fits. The iron is then closed, thereby completely inclosing and thoroughly heating the joint from all sides. The solder is then applied through the passage $f$ for the particular socket or opening $e$, and the solder melts and runs down into the passage $e$, and as the iron is moved back and forth the length of the joint the solder runs in between the turns of the wire and around the wire on every side, and is thoroughly melted and heated and fills all openings and forms a perfect and complete joint. The iron can then be opened and removed, the operation being performed quickly and easily, and accomplishing the object in the most perfect manner.

The many advantages of this invention for use in electric wiring are obvious. By means of this invention a perfect joint can be formed, no matter how cold or windy the weather is, as the wire is completely inclosed in the heated iron, whereby all this heat is utilized and applied to the joint upon all sides. Of course the irons $a$ can be made of any suitable material and of any suitable exterior shape.

Having thus fully described our invention, what we claim as new, and desire to secure by Letters Patent, is—

1. A divided soldering-iron arranged to open and close upon the wires to be treated, the sections thereof having one or more registering grooves to form pockets to snugly receive and completely surround the wire or wires, and the solder-passages to each pocket.

2. A soldering-iron arranged to open and close upon wire-joints, having one or more pockets or sockets to snugly receive and surround the wire, and the solder-passages to such pockets, substantially as described.

3. A soldering-iron arranged to open and close, having a series of transverse pockets or openings to receive and surround a wire-joint, said series comprising pockets of various diameters, each pocket or opening having a solder-passage thereinto from the exterior of the iron, substantially as described.

4. The soldering-iron consisting of the elongated soldering-iron tapering to one end and longitudinally divided into two sections, the pivoted hand-levers respectively secured to the rear ends of said sections to open and close the sections, the inner faces of said sections having the series of registering transverse grooves of various depths forming the series of pockets of various diameters to embrace the wires and distribute the solder thereon, as set forth.

5. The tapered soldering-iron formed into two longitudinal sections, the pivoted levers secured to said sections respectively to close and open the same, transverse registering grooves extending completely across the inner faces of said sections, forming the pockets to inclose the wire-joint, and the passage through one of the sections to the pocket and countersunk at its outer end, substantially as set forth.

In testimony that we claim the foregoing as our own we affix our signatures in presence of two witnesses.

WILLIAM S. COOK.
MOSES CHALMER COOK.

Witnesses:
FRANK J. PERSONS,
WILLIAM B. BERRY.